Patented May 4, 1943

2,318,388

UNITED STATES PATENT OFFICE 2,318,388

HEXYL-DICHLORO RESORCINOL ANTISEPTIC

Frank W. Hartman and Victor Schelling, Detroit, Mich., assignors to Henry Ford Hospital, Detroit, Mich., a corporation of Michigan No Drawing. Application November 16, 1939, Serial No. 304,734

4 Claims. (Cl. 167—31)

This invention has for its principal object to provide as a new and improved compound a substituted derivative of resorcinol having highly advantageous and unexpected properties for use primarily as an antiseptic.

The ideal antiseptic is one which must have high bactericidal value against both cocci and bacilli and low toxicity for tissue cells both locally and generally. It must also preferably be comparatively odorless, or at least have a non-obnoxious or non-repellent odor and be sufficiently stable so as not to lose any of its antiseptic or germicidal properties too rapidly. Likewise it is of great importance that the substance may be used in highly diluted form so as to avoid discomfort to the patient or user.

After a long period of experimentation we have succeeded in synthesising a new compound which after extensive experimental and clinical use has shown highly unexpected properties and results. Although great antiseptic properties have been claimed for resorcinol, this compound has not proved to be entirely satisfactory or successful and numerous proposals have been made to increase the antiseptic strength of resorcinol by incorporating various substitutes therein. Johnson and Lane (J. Am. Chem. Soc. 43, 348) systematically investigated the influence of alkyl groups on the antiseptic properties of resorcinol and showed that the antiseptic strength of resorcinol was markedly increased by the incorporation of an alkyl group and that the increase in disinfecting properties is a function of the size of the group introduced. That halogen in the ring of phenolic compounds also increases their antiseptic power has been known for a long time. While it has been known that, as stated above, an increase in disinfecting properties would be a function of size of the group introduced into the nucleus of a resorcinol compound, this would not necessarily increase the value of the compound for use as an antiseptic for it would seem that such an increase would decrease the value of the compound as an antiseptic because of an expected increased toxicity of the compound, particularly for application to burned areas, granulating surfaces and wounds generally.

After synthesising a new compound, namely, hexyl-dichloro resorcinol, we have found after exhaustive laboratory and clinical tests that not only has the compound shown surprisingly and highly unexpected effectiveness against bacteria of both the cocci and bacilli group, but remarkably low toxicity locally with low systemic toxicity.

Starting with chloro-resorcinol (1-3-dihydroxy-4-chloro-benzene, Eastman) this is further chlorinated with sulfuryl-chloride $SO_2Cl_2$ according to the method described by Moore, Day, and Suter (J. Am. Chem. Soc. 56, 2456, 1934) the reaction being graphically represented as follows:

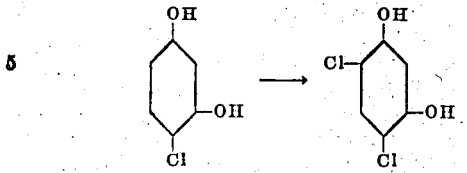

The resulting 4-6-dichloro-resorcinol is then treated with caproic acid chloride $$CH_3(CH_2)_4COCl$$

and subjected to heat to form the 4-6-dichloro-resorcinol-dicaproylester.

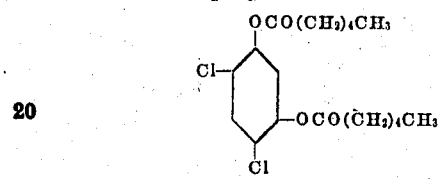

This compound when distilled in a high vacuum is a clear oil. The Rosenmund and Schnurr rearrangement reaction with $AlCl_3$ (Ann. Chem., 460, 56, 1928) was applied to the diester above formed. Advantage was taken from the observation of Stoughton, Baltzly and Bass (J. Am. Chem. Soc. 56, 2007, 1934) that the second alkyl group of the diester in the rearrangement of dihydroxibenzenes can be included in the reaction by adding one mol. of the free phenol. The proportion of the reacting substances in this case were accordingly as follows: 1 mol. of dichloro-resorcinol-dicaproylester, 1 mol. dichloro-resorcinol and 2.2 mols. anhydrous $AlCl_3$.

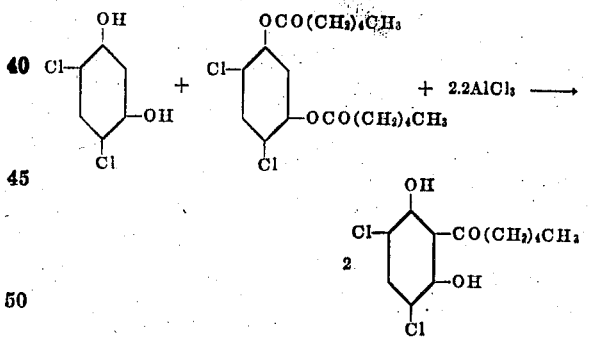

The resulting ketone (2-hexyl-4-6-dichloro-resorcinol)

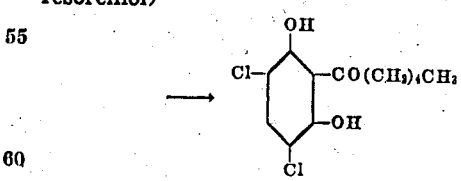

is distilled in high vacuum (B. P. 180–185° C.). It is a yellowish oil which easily crystallizes in the cold (M. P. 119–120° C.). The ketone is reduced with amalgamated zinc and hydrochloric acid HCl according to Clemmensen to the corresponding alkyl compound 4-6-dichloro-2-hexyl-resorcinol

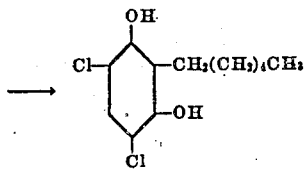

The resulting hexyl-dichloro-resorcinol distills in high vacuum at 143–146° C. It is a slightly yellowish liquid which on cooling crystallizes to a white mass (M. P. 36–38° C.).

The compound above has been found highly effective in combination with small amounts of acid such, for example, as hydrochloric acid, so that the pH would be between 2 and 3, as this results in a marked highly unexpected increase in the effectiveness and the relatively low pH is preferred because it adds but little to the tissue toxicity. Used in combination with tannic acid, which as is now well known has proved highly effective in the treatment of burns, and keeping the pH as above outlined, very remarkable results have been achieved. It has been found that a dilution highly effective in ten minutes, as follows has been obtained:

| F. D. A. method—Shippen mod. | | Salle & Lazarus method | | |
|---|---|---|---|---|
| Highest dilution kills in 10 min. but not in 5 min. | | Tissue culture | Toxicity index | |
| A | B | C | C/A | C/B |
| S. aureus 14,500 plus .36% HCl 35,000 | E. typhi 5000 30,000 | 5300 | .36 | 1:06 |

In addition to the marked increase of effectiveness obtained by the use of weak acid solutions with carbocyclic antiseptic phenol derivatives, the present invention is extremely important from the standpoint of its marked adaptability to be applied with tannic acid treatment of burns which treatment has now gone into very widespread use. One of the difficulties heretofore experienced with such treatment has been that of preventing infection; the injured tissue resulting from severe burns being highly susceptible to toxic effects as well as to bacterial attack. Consequently a carbocyclic antiseptic of the type hereinbefore described may be applied directly with tannic acid in the treatment of burns and when the pH is kept within the limits hereinbefore set forth, the tannic acid and carbocyclic antiseptic have marked, and highly desirable, synergistic properties.

We claim:

1. An antiseptic composition comprising 4-6-dichloro-2-n-hexyl-resorcinol.

2. An antiseptic composition comprising 4-6-dichloro-2-n-hexyl-resorcinol and an amount of acid such as to provide a pH value between 2 and 3.

3. An antiseptic composition comprising 4-6-dichloro-2-n-hexyl-resorcinol and an amount of hydrochloric acid such as to provide a pH value between 2 and 3.

4. An antiseptic composition comprising 4-6-dichloro-2-n-hexyl-resorcinol and an amount of tannic acid such as to provide a pH value between 2 and 3.

FRANK W. HARTMAN.
VICTOR SCHELLING.